United States Patent [19]
Junkers

[11] Patent Number: 5,946,789
[45] Date of Patent: *Sep. 7, 1999

[54] METHOD OF AND DEVICE FOR ELONGATING AND RELAXING A STUD

[76] Inventor: John K. Junkers, 7 Arrowhead La., Saddle River, N.J. 07540

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/533,583

[22] Filed: Oct. 18, 1995

[51] Int. Cl.[6] .............................. B23P 19/00; B23P 11/00
[52] U.S. Cl. .............................. 29/446; 29/452; 81/57.38
[58] Field of Search .................. 29/446, 452; 81/55, 81/57.38; 411/1, 221, 223, 432, 433, 533, 917, 932

[56] References Cited

U.S. PATENT DOCUMENTS

| | | | |
|---|---|---|---|
| 5,137,408 | 8/1992 | Junkers | 411/432 |
| 5,253,967 | 10/1993 | Orban et al. | 411/432 |
| 5,318,397 | 6/1994 | Junkers | 411/432 |
| 5,341,560 | 8/1994 | Junkers | 29/525.1 |
| 5,406,867 | 4/1995 | Junkers et al. | 81/57.38 |
| 5,468,106 | 11/1995 | Percival-Smith | 411/917 X |
| 5,538,379 | 7/1996 | Junkers | 411/432 |
| 5,539,970 | 7/1996 | Junkers | 29/446 |

*Primary Examiner*—S. Thomas Hughes
*Attorney, Agent, or Firm*—Michael J. Striker

[57] ABSTRACT

In order to elongate and relax a stud, a first part which is movable only in an axial direction engages the stud, a second part is connected with the first part, a friction element is connected with at least one of the parts so that the first part has more surfaces cooperating with other elements than the second part, and then at least a holding force is applied to the friction element while an opposite active force is applied to an outer peripheral surface of the second part so that the second part is moved in the transverse direction and the first part is moved only in the axial direction to elongate the engaged stud.

13 Claims, 1 Drawing Sheet

5,946,789

METHOD OF AND DEVICE FOR ELONGATING AND RELAXING A STUD

BACKGROUND OF THE INVENTION

The present invention relates to a method of and an arrangement for elongating and relaxing a stud arranged in an object, such as for example in a flange or the like.

Methods of the above mentioned general type are known in the art. For example, in order to elongate or relax a stud, a mechanical nut having two elements is utilized, and the elements are moved relative to one another in opposite axial directions to elongate the stud or to relax it. There are however many applications where no gaskets are used to seal the two flange portions or where the stud is oversized relative to the required clamping force. Therefore, with a steel-to-steel flange connection there is no compression feasible, and with an oversized stud there is no stud elongation feasible, and thus axial movement of one of the parts becomes possible.

My U.S. Pat. No. 5,341,560 discloses a method of elongating and relaxing a stud in accordance with which a first part engages the stud, a friction element is connected with the first part, a second part is connected with the first part, and a holding force is applied to the first part while an opposite active force is applied to the second part via corresponding first and second engaging means so that while the second part turns, the first part moves in the axial direction and elongates (relaxes) the stud. This method eliminates the disadvantages of the prior art. In some instances, however, the first part can be unaccessible, or it might be undesirable to apply the holding force to the first part. In any event, the mechanical tensioner described in my above identified patent can cooperate only with such a tool which has a central structure designed to apply a holding force to the first part, and an offset or surrounding structure designed to apply a turning force to the second part. Such tools are special tools, since in conventional tools the situation is just opposite. In the center of the tool there is always a drive part, while the housing which can be used to apply a holding force or to carry a holding element is located offset relative to the central drive part or surrounds the drive part. It is believed to be clear that in many cases it is not desirable to provide a special tool for such a mechanical tensioner.

SUMMARY OF THE INVENTION

Accordingly, it is an object of the present invention to provide a method of and a device for elongating and relaxing a stud, which is a further improvement of the prior art methods and which eliminates the disadvantages of the prior art methods.

In keeping with these objects and with others which will become apparent hereinafter, one feature of the present invention resides, briefly stated, in a method of elongating and relaxing a stud having an axis and arranged in an object, the method comprising the steps of connecting the stud with a first part which is movable only in an axial direction so as to pull the stud in the axial direction to elongate the stud and thereby to tension it in the object or to relax the stud; moving the first part only in the axial direction by connecting the first part with a second part which is moveable in a transverse direction; connecting a friction element with the first part, so that the first part has more surfaces cooperating with other elements and subjectable to friction during movement than the second part and so that the second part is not connected with the friction element but instead is freely turnable relative to the friction element while freely abutting against the friction element, applying at least a holding force to the friction element; and applying an active force to the an outer surface of the second part so that the second part is moved in the transverse direction while the first part is moved by friction element in the axial direction to move the stud in the axial direction without turning and to elongate the stud.

It is to be understood that the force applied to the friction element can be not only a holding force, but it can also be an active force which however acts in a direction opposite to the direction of action of the force applied to the second part for turning the latter.

In accordance with another feature of the present invention, a device for elongating and relaxing a stud is provided which includes the above mentioned first part engageable with the stud, a friction element connectable with the first part, a second part connectable with the first part, engaging means provided on the friction element so that the friction element can be engaged and a holding force can be applied to the friction element, and engaging means provided on the outer surface of the second part so that an active force can be applied to the second part from outside.

When the method is performed and the device is designed in accordance with the present invention, a standard power tool can be used for cooperation with the device, which tool has a housing which is offset relative to the central drive or surrounds the central drive and is provided with a holding element which applies a holding force to the friction element, and a drive cooperating with the outer surface of the second part of the device for turning the second part. Thus, no special tools are needed to operate with the method and device in accordance with the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a cross-section of a mechanical tensioner for elongating and relaxing a stud in accordance with the method of the present invention.

DESCRIPTION OF THE PREFERRED EMBODIMENTS

Figure 1:
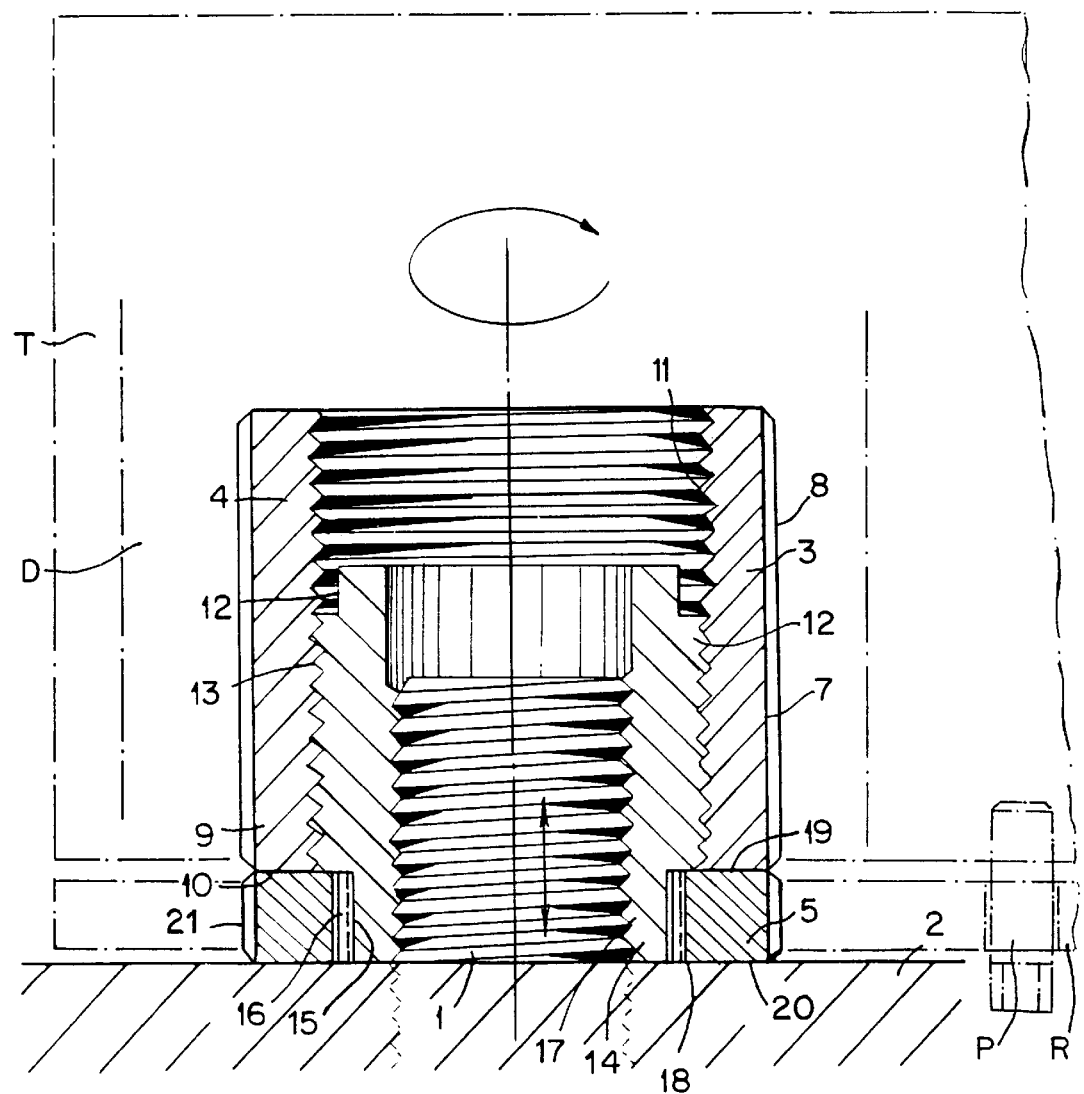

A method and a device are used in accordance with the present invention for elongating and relaxing a stud 1 which is arranged in an outside object such as a flange 2 and the like. In accordance with the invention, the stud 1 is engaged by a first inner part which is identified as a whole with reference numeral 4 and is movable only in an axial direction to pull the stud in the axial direction so as to elongate it and thereby to tension it in the object, or to relax the stud as will be explained hereinbelow. The inner part 4 is moved only in the axial direction by means of a second outer part 3 which is connected with the inner part 4 and is movable in a transverse direction. A friction element 5 cooperates with at least one of the parts 3 and 4 so as to change friction between the parts 3 and 4 as will be explained hereinbelow.

The outer part 3 has a cylindrical peripheral surface 7 provided with engaging formations, for example axially extending splines 8, to be engaged by a tool. The outer part 3 also has a portion 9 which faces toward the flange 2 and has a surface 10 arranged to abut against the friction element 5. Finally, the outer part 3 has an inner thread 11. The outer part 3 can be formed as a tubular member provided with the above specified formations.

The inner part 4 has an outer surface 12 provided with a thread 13 which engages with the thread 11 of the inner surface of the outer part 3. The inner part 4 further has a portion 14 which has an outer surface 15 provided with engaging formations, for example axially extending splines 16. Finally, the inner part 4 has an inner surface provided with engaging formations formed for example as an inner thread 17, for engaging with the stud 1. The inner part 4 is also formed as a tubular member.

The friction element 5 is disc-shaped. It is located between the end portion 9 of the outer part 3 and the flange 2 on the one hand, and surrounds the portion 14 of the inner part 4 on the other hand. The friction element 5 has an inner surface provided with a plurality of engaging formations, for example axially extending splines 18, which engage with the axially extending splines 16 of the portion 14 of the inner part 4. The friction element 5 has a surface 19 against which the surface 10 of the outer part 3 abuts, and also an opposite surface 20 which abuts against the outer surface of the flange 2. Finally, the friction element 5 has an outer circumferential surface provided with a plurality of engaging formations, for example axially extending splines 21.

The thread 11 of the outer part 3 and the thread 13 of the inner part 4 have one direction, while the thread 17 of the inner part 4 has another direction. For example, the thread 17 can be a right-hand thread, while the threads 11 and 13 can be left-hand threads.

The connecting means 11, 13 connecting the inner part 4 with the outer part 3 is the thread means, while the connecting means 16, 18 for connecting the inner part 4 with the friction element 15 are the spline means. These connecting means 11, 13 and 16, 18 are axially spaced from one another.

It can be seen that the inner part 4 has four surfaces cooperating with other parts and subjectable to friction. In particular, it has the surface of the inner thread 17, the surface of the outer thread 13, the end surface abutting against the friction element 5, and the end surface abutting against the flange 2. In contrast, the outer part 3 has only two surfaces which are subjectable to friction, namely the surface of the inner thread 11, and the surface 19 abutting against the friction element 5.

In order to elongate or relax the stud in accordance with the inventive method, a standard tool T which is shown schematically in the drawings is applied so that its drive part D around the central axis engages the outer splines 8 of the outer part 3 to turn the latter while a reaction part R of the tool which can be connected for example to the immovable housing of the tool, which surrounds the drive part D engages the outer splines 21 of the friction element 5 so as to at least hold the friction element in order to prevent its rotation. When the outer part 3 is moved in a direction which is transverse to an axis of the tensioner and the stud, or more particularly is turned about this axis, its surface 10 abuts against the surface 19 of the friction element 5 and therefore the outer part 3 cannot move further onto the friction element 5 in the axial direction. Under the action of turning of the outer part 3 and due to the cooperation between the threads 11, 13, the inner part 4 is displaced in the axial direction, upwardly in the drawings along the cooperating axial splines 16, 18, but does not displace in the transverse direction or in other words does not turn around the axis. During these movements the friction element 5 is neither displaced in the transverse direction (turned around the axis) nor in the axial direction. It is immovable relative to the flange 2. The axial upward displacement of the inner part 4 without the transverse displacement (turning around the axis) causes pulling of the stud 1 upwardly and therefore it is elongating.

Thus due to inventive cooperation of the parts 3 and 4 and the friction element 5 which imparts a higher friction to the inner part 4 than the outer part 3, when a force is applied to one of the parts 3, 4 in a transverse direction to the axis (by applying a force to one part, by holding one part and turning another part, by applying a turning force to both parts in opposite directions with equal forces), after elimination of the gaps in the assembly the outer part 3 moves in the transverse direction to the axis (rotates) while the inner part 4 moves only in the axial direction to pull the stud 1 upwardly in the axial direction.

It is to be understood that in order to relax the stud 1 the outer part 3 must be displaced in an opposite transverse direction (turned around the axis in an opposite direction), so that the inner part 4 is displaced axially downwardly and the stud is therefore relaxed.

In the solution in accordance with the present invention, the engaging formations of the second part 3 to be engaged by the tool are provided on the cylindrical peripheral surface of the second part and formed for example as the axially extending splines 8. Similarly, the engaging formations of the friction element 5 to be engaged by the reaction part are also provided on the cylindrical peripheral surface of the friction element and formed as axially extending splines 21. The splines 8 and the splines 21 are substantially coextensive, and provided on surfaces which form continuations of one another or at least are located very close to one another, and therefore it is very convenient to engage the splines 8 by the tool and the splines 21 by the reaction part.

The reaction part R can be formed of one piece with the housing of the tool T. On the other hand it can be formed as a separate member as shown in the drawing. The reaction part R here is a link provided with an inner opening which has inner splines corresponding to the outer splines 21 of the friction element 5. In order to make the reaction part immovable during elongating and relaxing of the stud, the reaction R is immovably connected with the housing of the tool T, for example by a threaded pin P which extends through an opening in the reaction part R and is threaded in a threaded hole of the housing of the tool T. The drive part of the tool D is not shown and described in detail and it can be a conventional part for example a ratchet of a ratchet-pawl mechanism of a conventional power tool, in which the ratchet has an inner polygonal opening with inner splines corresponding to the splines 8 of the second part 3.

It will be understood that each of the elements described above, or two or more together, may also find a useful application in other types of methods and constructions differing from the types described above.

While the invention has been illustrated and described as embodied in a method of and a device for elongating and relaxing a stud, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of elongating or relaxing a stud having an axis and arranged in an object, the method comprising the steps of connecting the stud with a first part which is movable only in an axial direction; moving the first part only in the axial direction by connecting the first part with a second part which is moveable in a transverse direction and moving the second part in the transverse direction so that when said second part is moved in the transverse direction it moves said first part in the axial direction; connecting a friction element with the first part, so that the first part has more surfaces cooperating with other elements than the second part and so that the second part is not connected with the friction element but instead is freely turnable relative to the friction element while freely abutting against the friction element; applying a holding force directly to the friction element via first engaging means provided on the friction element so as to hold said first part stationary in the transverse direction; and applying an opposite active force, which is opposite to the holding force, to an outer peripheral surface of the second part via second engaging means thereby moving the second part in the transverse direction, and moving the first part in the axial direction to move a part of the stud in the axial direction without turning; and elongating or relaxing the stud in response to the movement of the first part connected with the stud, in the axial direction.

2. A method as defined in claim 1, wherein the step of connecting the first part with the stud is performed by threading the first part with the stud and the step of connecting the first part with the second part is performed by threading the first part with the second part.

3. A method as defined in claim 1; and further comprising the step of arranging the friction element between the object and an end portion of the second part which faces the object so that the friction element surrounds an end portion of the first part which faces the object.

4. A method as defined in claim 1, wherein said step of applying an opposite active force includes engaging the second part by a tool and moving the second part by the tool in the transverse direction.

5. A method as defined in claim 1, wherein said applying the holding force includes engaging the friction element by a tool and holding the friction element immovably in the transverse direction.

6. A method as defined in claim 1; and further comprising the step of providing first connecting means for connecting the first part with the second part so that the second part moves in the transverse direction, and second connecting means axially spaced from the first connecting means and connecting the first part with the friction element so that the first part moves only in the axial direction.

7. A method as defined in claim 1, wherein said applying at least a holding force to the friction element includes applying the holding force to an outer peripheral surface of the friction element, so that the holding force and the opposite active force are applied to the outer peripheral surfaces of the friction element and the second part correspondingly and substantially close to one another.

8. A device for elongation or relaxing a stud having an axis and arranged in an object, comprising a first part connectable with the stud and moveable only in an axial direction so as to pull the stud in an axial direction, a second part provided for moving said first part in the axial direction and for this purpose connected with said first part, said second part being movable in a transverse direction so that when said second part is moved in the transverse direction it moves said first part in the axial direction; a friction element connected with said first part, so that said first part has more surfaces cooperating with other elements than said second part and so that said second part is not connected with said friction element but instead is freely turnable relative to said friction element while freely abutting against the friction element, said friction element having first engaging means such that a holding force is applicable to said friction element through said first engaging means so as to hold said first part immovably in the transverse direction, while said second part has an outer peripheral surface provided with second engaging means to which an opposite active force, which is opposite to the holding force, is applicable, so that when said second part is moved in said transverse direction and said friction element is held immovably, said first part is moved in said axial direction to move a part of the stud in said axial direction without turning and thereby the stud is elongated or relaxed in response to the movement of said first part connected with the stud, in said axial direction.

9. A device as defined in claim 8; and further comprising first thread means connecting said first part with the stud, and second thread means connecting said first part with said second part.

10. A device as defined in claim 8, wherein said friction element is arranged between the object and an end portion of said second part which faces the object, so that said friction element surrounds an end portion of said first part which faces the object.

11. A device as defined in claim 8, wherein said second engaging means of said second part is formed so that said opposite active force is applicable to said second part by engaging said second engaging means of said second part by a tool so as to move said second part by the tool in the transverse direction.

12. A device as defined in claim 8, wherein said first engaging means of said friction element is formed so that said holding force is applicable to said friction element by engaging said first engaging means of said friction element by a tool so as to hold said friction element during movement of said second part in said transverse direction.

13. A device as defined in claim 8, wherein said friction element has an outer peripheral surface provided with said first engaging means, so that said first engaging means and said second engaging means are arranged on the outer peripheral surfaces of said friction element and said second part correspondingly and close to one another.

* * * * *